(12) United States Patent
Vadstrup

(10) Patent No.: US 7,317,296 B2
(45) Date of Patent: Jan. 8, 2008

(54) ELECTRIC MOTOR

(75) Inventor: Pierre Vadstrup, Tilsit (DK)

(73) Assignee: Grundfos A/S, Bjerringbro (DK)

( * ) Notice: Subject to any disclaimer, the term of this patent is extended or adjusted under 35 U.S.C. 154(b) by 647 days.

(21) Appl. No.: 10/848,722

(22) Filed: May 19, 2004

(65) Prior Publication Data
US 2004/0251869 A1 Dec. 16, 2004

(30) Foreign Application Priority Data
May 20, 2003 (EP) .................................. 03011406

(51) Int. Cl.
*H02P 7/36* (2006.01)

(52) U.S. Cl. ...................... 318/807; 318/471; 318/472; 290/1 R; 290/1 A; 136/203; 136/236.1; 417/32; 62/3.3; 62/3.7

(58) Field of Classification Search ........ 318/430–434, 318/471–474; 136/203, 205, 230, 242, 236.1; 60/324; 62/3.3, 520, 3.7; 388/825; 340/870.28; 417/32; 290/1 R, 1 A
See application file for complete search history.

(56) References Cited

U.S. PATENT DOCUMENTS

| | | | |
|---|---|---|---|
| 4,753,682 A | | 6/1988 | Cantoni |
| 4,942,863 A | * | 7/1990 | Chou et al. .............. 126/110 E |
| 5,158,406 A | * | 10/1992 | Ulinskas ................. 408/115 R |
| 5,242,403 A | | 9/1993 | Falb et al. |
| 5,486,728 A | | 1/1996 | Hirama |
| 5,507,103 A | * | 4/1996 | Merritt ........................... 34/97 |
| 5,544,488 A | * | 8/1996 | Reid .............................. 62/3.7 |
| 6,066,002 A | | 5/2000 | Sterckx et al. |
| 6,166,317 A | * | 12/2000 | Volk, Jr. ..................... 136/201 |
| 6,232,543 B1 | * | 5/2001 | Nagata ........................ 136/242 |
| 6,272,873 B1 | * | 8/2001 | Bass ........................... 62/238.3 |
| 6,316,714 B1 | * | 11/2001 | Kotanagi et al. ............ 136/242 |
| 6,335,572 B1 | * | 1/2002 | Uno et al. .................. 290/1 R |
| 6,434,512 B1 | * | 8/2002 | Discenzo .................... 702/184 |
| 6,548,750 B1 | * | 4/2003 | Picone ........................ 136/203 |
| 6,600,249 B2 | * | 7/2003 | Nelson et al. ................ 310/91 |
| 6,606,866 B2 | * | 8/2003 | Bell .............................. 62/3.7 |
| 6,625,990 B2 | * | 9/2003 | Bell .............................. 62/3.3 |
| 6,747,572 B2 | * | 6/2004 | Bocko et al. .......... 340/870.16 |
| 6,941,761 B2 | * | 9/2005 | Gatecliff et al. .............. 62/3.3 |
| 7,100,369 B2 | * | 9/2006 | Yamaguchi et al. .......... 60/324 |
| 2001/0023591 A1 | | 9/2001 | Maeda et al. |

(Continued)

FOREIGN PATENT DOCUMENTS

EP 0 759 507 2/1997

(Continued)

OTHER PUBLICATIONS

Hering, E. 1992 Physik für Ingenieure XP-002255639 pp. 686-688.

*Primary Examiner*—Paul Ip
(74) *Attorney, Agent, or Firm*—McGlew and Tuttle, P.C.

(57) ABSTRACT

The electric motor is equipped with an electronic control, for example in the form of a frequency converter (2) and comprises at least one Seebeck element (6) whose one side is connected to the motor (1) in a heat-conducting manner and whose other side is in heat-conducting connection with a cooling medium. The electrical output power of the Seebeck element (6) is led to the electronic control (2) of the motor (1).

20 Claims, 3 Drawing Sheets

U.S. PATENT DOCUMENTS

| | | | |
|---|---|---|---|
| 2002/0092557 A1 | 7/2002 | Ghoshal | |
| 2002/0145538 A1* | 10/2002 | Bocko et al. | 340/870.28 |
| 2003/0133492 A1* | 7/2003 | Watanabe | 374/179 |
| 2003/0161732 A1* | 8/2003 | Kimberlin et al. | 417/32 |
| 2003/0168641 A1* | 9/2003 | Funahashi et al. | 252/500 |
| 2003/0217766 A1* | 11/2003 | Schroeder et al. | 136/230 |
| 2003/0225442 A1* | 12/2003 | Saadat | 607/105 |
| 2004/0031514 A1* | 2/2004 | Bell | 136/203 |
| 2004/0221577 A1* | 11/2004 | Yamaguchi et al. | 60/520 |
| 2004/0244385 A1* | 12/2004 | Gatecliff et al. | 62/3.3 |
| 2005/0076942 A1* | 4/2005 | Hirst et al. | 136/205 |
| 2005/0254800 A1* | 11/2005 | Nelson et al. | 388/825 |
| 2005/0271916 A1* | 12/2005 | Yang et al. | 429/20 |
| 2006/0032525 A1* | 2/2006 | Olsen et al. | 136/203 |
| 2006/0107987 A1* | 5/2006 | Chen et al. | 136/205 |
| 2006/0118065 A1* | 6/2006 | Bassett | 123/3 |
| 2006/0131186 A1* | 6/2006 | Ito et al. | 205/782 |
| 2006/0254638 A1* | 11/2006 | Carmeli et al. | 136/205 |

FOREIGN PATENT DOCUMENTS

| | | |
|---|---|---|
| JP | 61139248 | 6/1986 |
| JP | 08340066 A * | 12/1996 |
| JP | 11299289 | 10/1999 |
| JP | 2002153036 | 5/2002 |

* cited by examiner

ELECTRIC MOTOR

CROSS REFERENCE TO RELATED APPLICATIONS

This application claims the benefit of priority under 35 U.S.C. § 119 of EP 03011406.0 filed May 20, 2003, the entire contents of which are incorporated herein by reference.

FIELD OF THE INVENTION

The invention relates to an electric motor with an electronic control.

BACKGROUND OF THE INVENTION

Electric motors nowadays are applied in almost all technical fields. One therefore strives to increase the efficiency of such motor and thus their economic efficiency. Measures increasing the efficiency are worthwhile, in particular with motors which run for a long operational time period, such as drive motors of pump units, compressors, ventilators or likewise, since corresponding savings in consumption are to be expected.

Modem electric motors have an electronic control which is connected in series to the actual motor in order from the essentially constant direct or alternating voltage available on the mains side to produce a voltage suitable for the operation of the motor. For this one typically applies transformers, for example in the form of frequency converters which have an input circuit in which the alternating voltage is rectified, an intermediate circuit in which the desired voltage level is set, and a power circuit in which the intermediate circuit voltage is led to the motor windings in a suitably controlled manner. Asynchronous motors for example are operated in this manner but also permanent magnet motors are electronically commutated.

For increasing the efficiency of units, the technical exploitation of their waste heat is counted as belonging to the state of the art, be it by way of additional heat exchangers, heat pumps or likewise. These measures at present are not suitable for motors of a small construction type for reasons of costs.

The application of semiconductor elements, so-called Seebeck elements is counted as belonging to the state of the art for exploiting the waste heat. It is known from the U.S. Pat. No. 6,019,098 to use such Seebeck elements for exploiting the waste heat of a boiling vessel. From U.S. Pat. No. 5,419,780 it is known to use the waste heat of an electronic component for producing current for operating a ventilator which then cools this component. It is known from U.S. Pat. No. 4,753,682 to use the waste heat of a combustion motor for producing current by way of Seebeck elements. The exploitation of waste heat of electronic components by way of one or more Seebeck elements, and the supply of the energy gained at the same time to the componentry in a useful manner is also counted as belonging to the state of the art (U.S. Pat. 6,066,002).

The use of semiconductor elements of the previously mentioned type, specifically Peltier elements for the targetted cooling is also counted as belonging to the state of the art. It is known from U.S. Pat. No. 5,486,728 to cool a micromotor by way of such Peltier elements. These Peltier elements however require an additional energy supply and thus worsen the efficiency.

SUMMARY OF THE INVENTION

Against this background it is the object of the invention to improve an electric motor of a known type with regard to its efficiency.

According to the invention, an electric motor is provided with an electronic control. At least one Seebeck element is provided whose one side in connected to the motor in a heat-conducting manner and whose other side is in heat-conducting connection with a cooling medium. The electrical output power of the Seebeck element is led to the electronic control of the motor.

The basic concept of the present invention is to use the waste heat of the motor which may not otherwise be exploited, for producing electrical energy by way of the application of at least one Seebeck element. The basic problem, the fact that the electrical energy obtained by way of a Seebeck element may not be reused or not economically reused, in particular with electric motors of a small or middle construction size, is solved by the present invention in a clever manner by way of the fact that this electrical energy may be supplied at a suitable location of the electronic control of the motor and may thus be directly used for the purpose of driving. At the same time it is to be ensured that not only does an as different as possible temperature level exist on both sides of the Seebeck element, but also that the heat conduction is effected through the Seebeck element and does not bypass this. The first is achieved by way of the fact that one side of the Seebeck element is connected to the motor in a heat-conducting manner and the other side is in heat-conducting connection with a cooling medium; this may be a flow of cooling air impinging the motor, a separate cooling fluid or in particular with pump units, the delivery fluid. In order to achieve the flow of heat being effected at least proportionally through the Seebeck element, one is to take suitable design measures, in particular it is to be ensured that in the direct vicinity of the Seebeck element there exists no heat-conducting connection between the previously mentioned temperature levels.

If as previously outlined, a converter, in particular a frequency converter is connected in series to the electric motor, thus the electronic control comprises a frequency converter, then it is particularly advantageous to let the Seebeck element supply the intermediate circuit of the frequency converter, thus a part of the electronic control which conducts a constant voltage. With the frequency converter, the intermediate circuit is an energy storer so to speak so that here one may supply energy in a particularly favorable manner, in particular for charging the intermediate circuit capacitor.

Since the voltage conducted by the intermediate circuit as a rule does not correspond to the voltage delivered by the Seebeck element or elements, in particular since with the Seebeck element the voltage fluctuates depending on the prevailing temperature difference, according to the invention, a DC/DC converter is connected between the Seebeck element and the intermediate circuit, which ensures a suitable adaptation to the voltage mains level of the intermediate circuit of the frequency converter.

According to the size of the applied motor, according to the invention not only one but also a multitude of Seebeck elements is provided. According to demands, these may be connected in parallel or series in order to achieve a useable voltage current level. Although in the following one speaks of a Seebeck element, it is however to be understood that at the same time a multitude of Seebeck elements may also be meant.

Since the voltage delivered by a Seebeck element increases depending of the prevailing temperature difference, and thus also the electrical energy delivered by the Seebeck element, it is useful to arrange the Seebeck element where most waste heat occurs or the highest temperatures are to be expected. This with a motor is usually in the winding wire which is why it is desirable to attach one side of the Seebeck element as close as possible to the winding wire, specifically to the stator winding. According to the invention it is therefore envisaged to connect one side of the Seebeck element to the stator winding in a heat-conducting manner, and specifically preferably in the region of the end winding, thus where the winding wire is easily accessible and is not required with regard to drive technology.

One advantageous arrangement of the Seebeck element between a winding wire of the stator or a part of the stator winding and a stator lamination is useful in particular if it is the case of a pole segment motor, thus a motor with which the stator lamination bundle consists of individual segments.

If the motor is a cap-cooled motor, then according to a further formation of the invention a Seebeck element is usefully arranged between the stator and cap, and specifically on the inner side of the cap. The Seebeck element on one side is then connected in a heat-conducting manner to the stator winding and on the other side in a heat-conducting manner to the cap, which as a rule is cooled by fluid.

The other (cold side) of the Seebeck element is to be connected to a heat sink of an as low as possible temperature level. In its simplest form this may be the heat sink of the motor which is cooled by the coolant air flow of the motor, thus for example the housing of the motor. With a pump unit the delivery medium of the pump may be advantageously used as a coolant. Then in a useful manner the other (cold side) of the Seebeck element is thus cooled by the delivery flow or a part delivery flow of the pump. If the motor is a part of a compressor of a cooling installation, the cooling fluid or also a cold surface of the installation or of the compressor impinged by the cooling fluid may serve as a heat sink.

If the pump unit comprises a wet-running motor, as this is often the case with centrifugal pumps, in particular for the delivery of water, it is then useful to connect the Seebeck element or elements to the can of the motor in a heat-conducting manner, and specifically to preferably arranged it or them on the dry side of the can. A Seebeck element may then be arranged between the stator and the can, be it radially or also axially if the can is provided with a suitable flange.

The solution according to the invention may be particularly advantageously applied if the motor and frequency converter or pump unit and frequency converter form a constructional unit. Then specifically the supply to the intermediate circuit of the frequency converter may be effected in the shortest of paths. Where appropriate printed strip conductors may be applied between the Seebeck element and the intermediate circuit. Moreover the waste heat of the frequency converter may also be used in the same manner if this is either suitably led away over a region which is allocated to the Seebeck element or if a separate Seebeck element is provided for this.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE INVENTION

Figure 1:
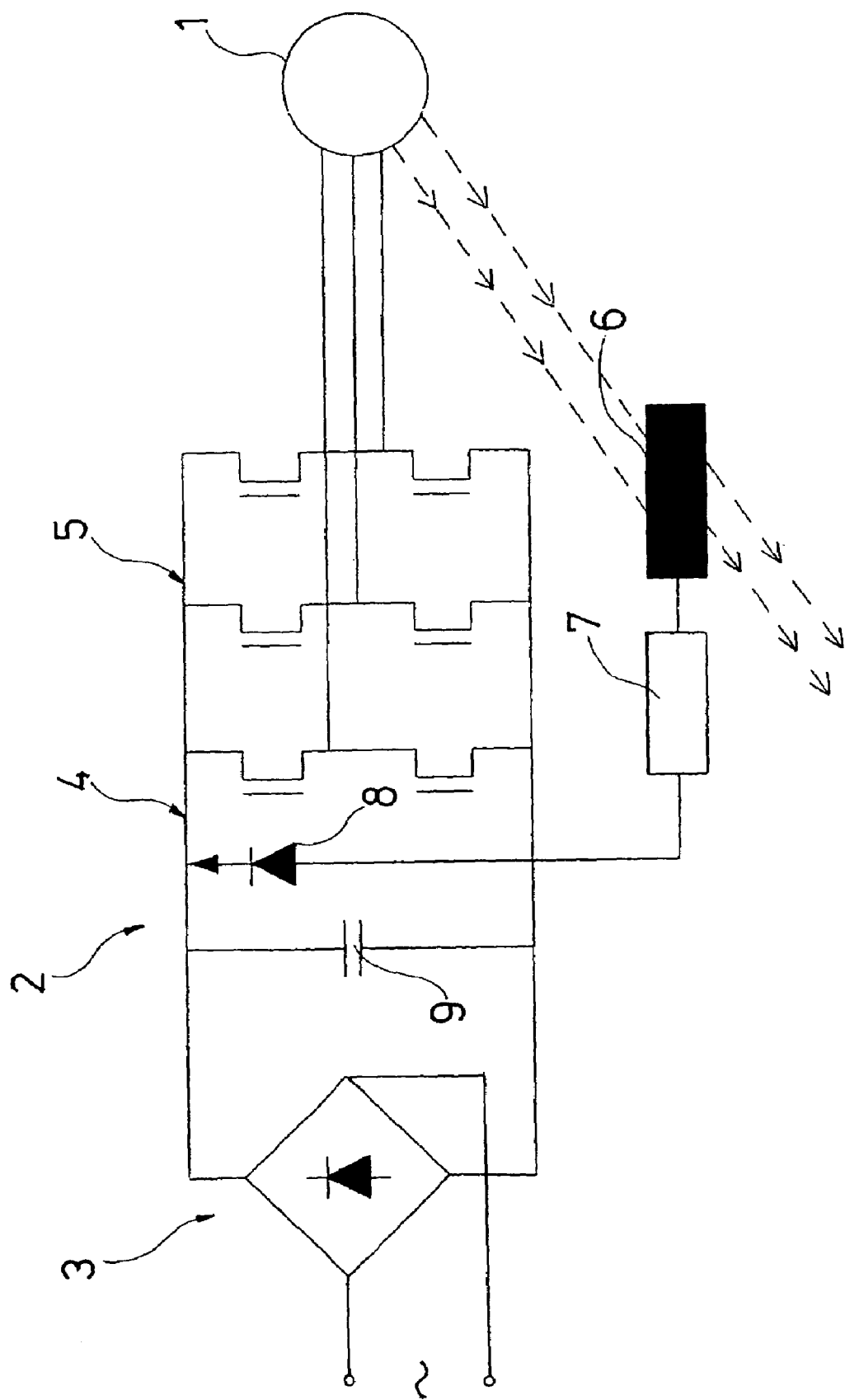
FIG. 1 is a block diagram of the electric motor controlled by a frequency converter with a Seebeck element and its supply into the frequency converter.

An electric motor 1 is shown in FIG. 1 in the form of an asynchronous motor which is activated by a frequency converter 2. The frequency converter 2 in a known manner consists of an input circuit 3, of an intermediate circuit 4 as well as of a power circuit 5. The supply voltage is rectified in the input circuit 3, brought to a constant voltage level in the intermediate circuit and in the power circuit 5 impinges the motor windings via suitable switches. The waste heat of the motor 1 is supplied to a Seebeck element 6 which here represents one or more Seebeck elements connected in series or parallel. The heat flow between the electric motor 1, the Seebeck element 6 and a heat sink is shown symbolized by interrupted double arrow lines. The Seebeck element 6 is connected to a DC/DC converter 7 which stabilizes the voltage of the Seebeck element 6 which fluctuates depending on the temperature difference, to the voltage level of the intermediate circuit 4. The DC/DC converter 7 via a back-flow block in the form of a diode 8 supplies the intermediate circuit 4. The energy supplied in this manner from the Seebeck element 6 to the frequency converter 2 is stored in the intermediate circuit 4, in particular in the intermediate circuit capacitor 9 and when required is switched by the power circuit 5 to the motor 1.

Figure 2:
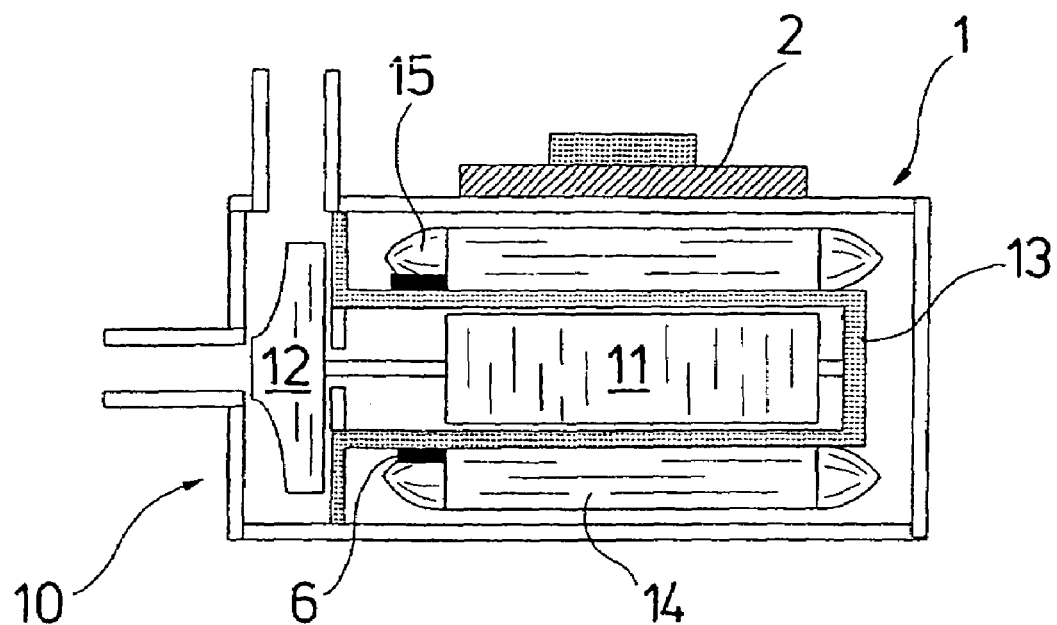
FIG. 2 is a greatly simplified representation of a section through a wet-runner centrifugal pump unit.

With the embodiment example according to FIG. 2, the electric motor 1 is designed as a canned motor and forms part of a pump unit 10, whose rotor 11 drives an impeller 12 in a manner known per se. The rotor 11 is rotatably mounted within the can 13 which is surrounded by the stator of the electric motor 1. The stator formed of the stator lamination bundle 14 and the stator winding comprises motor windings which lie free in the region of the end windings 15. A Seebeck element 6 is arranged in this region, and specifically to one side bearing on the end winding 15 and to the other side bearing on the can 13, where appropriate baked or adhered onto this. The can 13 is filled with fluid and the delivery fluid of the pump flows through this. In this manner the can 13 cooled by delivery fluid forms the heat sink, whereas the end winding 15 forms the warm part of the Seebeck element 6.

The Seebeck element 6 may also be arranged at the end face between the flange of the can 13 and the end winding 15. The frequency converter 2 which forms part of the electronic motor control is designed integrally with the pump unit 10.

Figure 3:
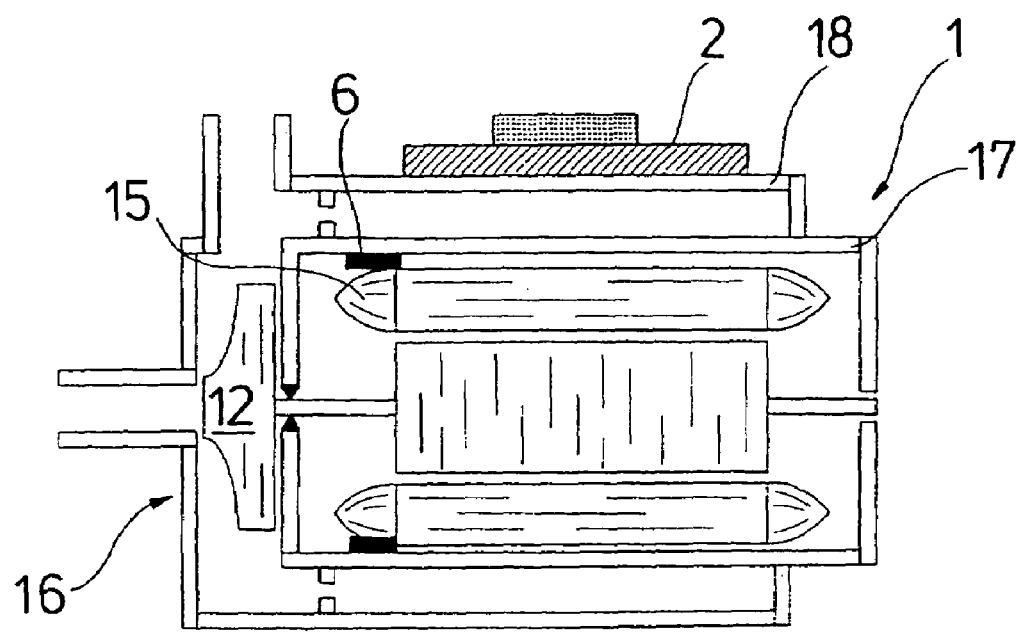
FIG. 3 is a section through a cap-cooled pump unit in a representation according to FIG. 2.

The embodiment variant according to FIG. 3 likewise comprises a pump unit 16, but in contrast to the embodiment according to FIG. 2 has a dry runner which is cap-cooled. A cap 18 surrounds the stator housing 17, and delivery fluid flows through the free space formed between the cap 18 and the stator housing 17. The openings to the pump space are arranged at a different pressure level so that a continuous through-flow of the cap space is ensured. In this case the Seebeck element 6 is arranged between the end winding 15 and the stator housing so that on the on side of the Seebeck element the heat arising in the motor winding prevails and on the other side the delivery fluid prevails as a heat sink.

Figure 4:
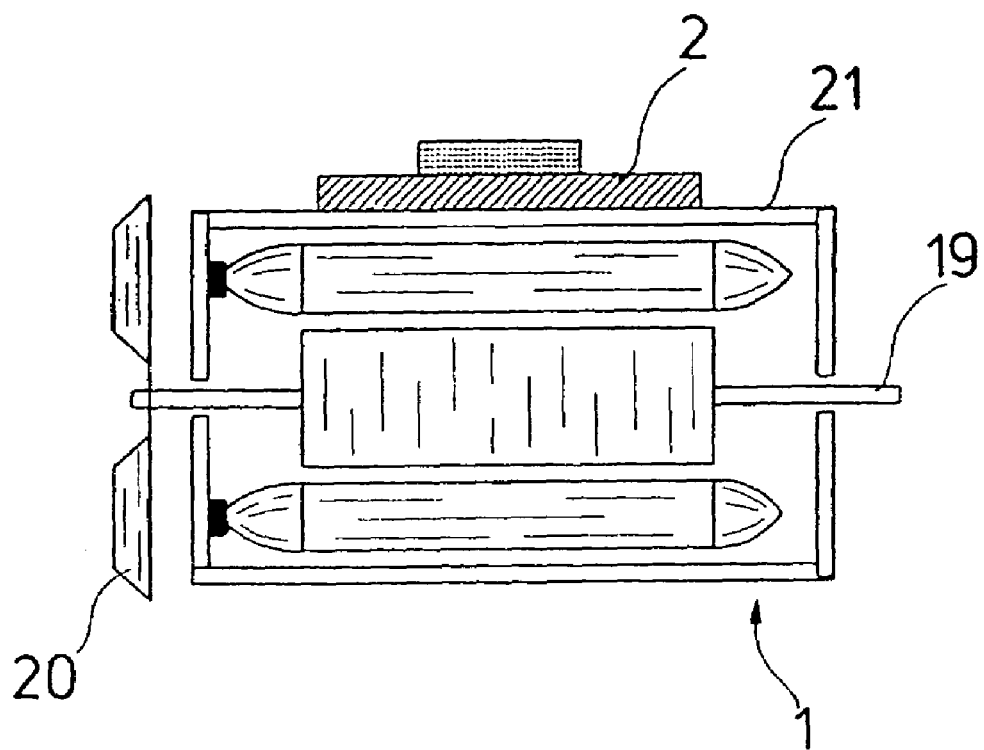
FIG. 4 is a section through the pump unit with a dry-runner, in the representation according to FIG. 2.

The motor represented by way of FIG. 4 is likewise a dry-runner on whose drive shaft 19 a fan wheel 20 is seated. The fan wheel leads a cooling airflow along the outside of the motor housing 21. The cooling airflow here in particular impinges the end face of the motor housing 21 which faces the fan wheel 20. At the inside, the Seebeck element 6 bears on this end face and its warm side is again connected to the end winding 15 in a heat-conducting manner.

Figure 5:
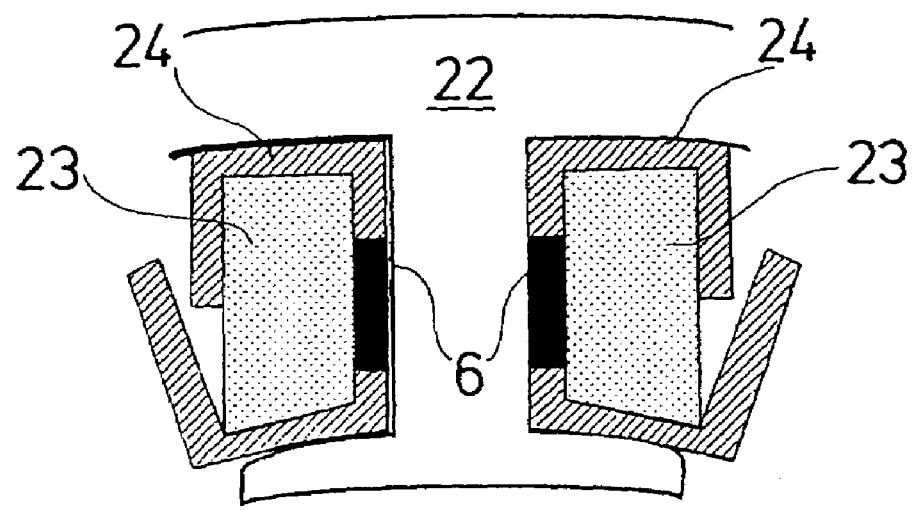
FIG. 5 is section through a part of a pole segment stator.

FIG. 5 shows the arrangement of a Seebeck element 6 within the stator as may for example be useful with pole segment motors with which the stator lamination bundle is formed of individual lamination bundle segments. A part of the stator lamination bundle 22 is represented in FIG. 5, and specifically with two stator grooves in which in each case a motor winding 23 is arranged. An insulation body 24, for example of paper or plastic is provided between the motor winding 23 and stator lamination bundle, into which the Seebeck element 6 is integrated. The insulation body 24 not only forms an electrical insulation but in particular a heat insulation of the motor winding 23 with respect to the stator lamination bundle 22. By way of this it is ensured that the heat to be led away out of the motor winding 23 is led through the Seebeck element 6 to the stator lamination bundle 22 as a heat sink and thus may be effectively exploited. The Seebeck element 6 is arranged in a recess of the insulation body 24, its electrical connections are led out on the side directed to the winding together with the winding. The Seebeck elements which are used here are for example flat in the manner of a chip and are designed in an essentially two-dimensional manner so that the one side may be connected to the heat source over a large area and the other side to the heat sink over a large area. Here one preferably uses Seebeck elements which with a lower temperature level may already exploit small temperature differences. Alternatively the insulation body may be used for leading out the electrical connections, for example by way of printing on suitable electrically insulated strip conductors which connect the Seebeck element.

With the previously described embodiments it is also to be ensured that the heat transfer between the motor winding and the heat sink where possible is effected largely through the Seebeck element 6 and not through adjacent heat bridges.

While specific embodiments of the invention have been shown and described in detail to illustrate the application of the principles of the invention, it will be understood that the invention may be embodied otherwise without departing from such principles.

What is claimed is:

1. An electric motor with an electronic control, the motor with control comprising:
   a motor;
   an electronic control, said electronic control including a frequency converter with an intermediate circuit;
   a pump unit including a pump delivering a cooling medium, said motor being connected to said pump and forming a part of said pump unit;
   a DC/DC converter;
   a Seebeck element with one side connected to the motor in a heat-conducting manner and with another side in heat-conducting connection with said cooling medium, said another side of said Seebeck element being cooled via said cooling medium, said DC/DC converter being connected to said Seebeck element and said frequency converter, wherein the electrical output power of the Seebeck element is supplied to said intermediate circuit, whereby the electrical output power of the Seebeck element is supplied to the electronic control of the motor.

2. An electric motor according to claim 1, wherein the motor has a stator winding with an end winding and the Seebeck element has one side connected in a heat-conducting manner to a region of the end winding.

3. An electric motor according to claim 1, wherein the motor has a stator with a winding wire and a stator lamination and a Seebeck element is arranged between the winding wire of the stator and the stator lamination.

4. An electric motor according to claim 1, wherein the motor is a cap-cooled motor and the Seebeck element is arranged between the stator and the cap on an inner side of a stator housing.

5. An electric motor according to claim 1, wherein the another side of the Seebeck element is connected in a heat-conducting manner to a heat sink which is cooled by the cooling airflow of the motor.

6. An electric motor according to claim 1, wherein the motor is a wet-running motor and the Seebeck element is connected in a heat-conducting manner to a can of the motor and arranged on the dry side of the can.

7. An electric motor according to claim 1, wherein the frequency converter forms a construction unit with the motor or with the pump unit.

8. An electric motor and control comprising:
   a motor;
   a pump unit, said motor forming a portion of said pump unit, said pump unit delivering a cooling source to said motor;
   a electronic motor control, said electronic control comprising a frequency converter, said frequency converter having an intermediate circuit;
   a DC/DC converter;
   a Seebeck element with one side connected to the motor in a heat-conducting manner and with another side in heat-conducting connection with said cooling source of said pump unit, said cooling source decreasing temperature of said another side of said Seebeck element, said DC/DC converter being connected to said Seebeck element and said intermediate circuit, wherein the electrical output power of the Seebeck element is supplied to said intermediate circuit via said DC/DC converter, whereby the electrical output power of said Seebeck element is connected to the electronic motor control.

9. An electric motor and control according to claim 8, wherein the motor has a stator winding with an end winding and the Seebeck element has one side connected in a heat-conducting manner to a region of the end winding.

10. An electric motor and control according to claim 8, wherein the motor has a stator with a winding wire and a stator lamination and a Seebeck element is arranged between the winding wire of the stator and the stator lamination.

11. An electric motor and control according to claim 8, wherein the motor is a cap-cooled motor and the Seebeck element is arranged between the stator and the cap, as the cooling source, on an inner side of a stator housing.

12. An electric motor and control according to claim 8, wherein the another side of the Seebeck element is connected in a heat-conducting manner to a heat sink cooling source which is cooled by the cooling airflow of the motor.

13. An electric motor and control according to claim 8, wherein the motor is a wet-running motor and the Seebeck element is connected in a heat-conducting manner to a can of the motor and arranged on the dry side of the can.

14. An electric motor and control according to claim 8, wherein the frequency converter forms a construction unit with the motor or with the pump unit.

15. An electric motor and control, comprising:
a motor;
a pump unit, said motor forming a portion of said pump unit, said pump unit delivering a cooling source to said motor;
a electronic motor control, said electronic control comprising a frequency converter, said frequency converter having an intermediate circuit;
a DC/DC converter;
a thermoelectric device having a first side and a second side, said first side being connected to said motor in a heat-conducting manner, said second side being in heat-conducting connection with said cooling source of said pump unit such that a temperature of said second side is lower than a temperature of said first side, whereby said thermoelectric device produces a Seebeck effect based on the difference between the temperature of said first side and the temperature of said second side, said DC/DC converter being connected to said Seebeck element and said intermediate circuit, wherein the electrical output power of the Seebeck element is supplied to said intermediate circuit via said DC/DC converter, whereby the electrical output power of said Seebeck element is connected to the electronic motor control, said DC/DC converter stabilizing voltage of said Seebeck element to voltage of said intermediate circuit.

16. An electric motor according to claim 15, wherein the motor has a stator winding with an end winding and the Seebeck element is connected in a heat-conducting manner to a the region of the end winding.

17. An electric motor according to claim 15, wherein the motor has a stator with a winding wire and a stator lamination and a Seebeck element is arranged between the winding wire of the stator and the stator lamination.

18. An electric motor according to claim 15, wherein the motor is a cap-cooled motor and the Seebeck element is arranged between the stator and the cap on an inner side of a stator housing.

19. An electric motor according to claim 15, wherein the Seebeck element is connected in a heat-conducting manner to a heat sink which is cooled by the cooling airflow of the motor.

20. An electric motor according to claim 15, wherein the frequency converter forms a construction unit with the motor or with the pump unit.

\* \* \* \* \*